REMOTE TERMINAL

Filed Oct. 18, 1962

INVENTORS
GEORGE D. PANAGIOTOU
NORMAN J. WOODLAND
BY [signature]
ATTORNEY

United States Patent Office 3,308,276
Patented Mar. 7, 1967

3,308,276
REMOTE TERMINAL

George D. Panagiotou, New York, and Norman J. Woodland, Chappaqua, N.Y., assignors to International Business Machines Corporation, New York, N.Y., a corporation of New York Filed Oct. 18, 1962, Ser. No. 231,501
6 Claims. (Cl. 235—61.11)

The present invention relates to a passive terminal for reading punched card information. More specifically, it relates to such a terminal containing solid state circuit elements which may be remotely located from a central computer.

The tremendous capabilities of present day commercial computers make completely computer controlled accounting systems extremely attractive for a multiplicity of business functions such as, inventory control, payroll, tax records, sales volume, as well as many types of personnel records. However, the cost of most of these computers is very high which makes it unfeasible for small businesses to own such a computer outright or for a single large business, such for example, as a department store, to employ a computer in each particular location where business transactions are occurring. It has been anticipated in the past that a single relatively large commercial computer can serve a plurality of small businesses or alternatively can serve a plurality of stations within a single large establishment when suitable remotely located terminal stations are connected to the central computer or process unit.

Since a number of such remote units are utilized in such an installation, it is desirable to keep both the original and maintenance cost of such remote units to an absolute minimum by any means which may be available.

The heart of such a remote terminal unit is a card reader or device for interpreting the punched hole information on standard business card forms and converting it to machine language for direct transmission to the central process unit. The usual prior art card reader or sensor comprises a series of wiper contacts and a conductive backing plate whereby, when a hole appears in a card, the wiper contact makes contact through the hole with the backing plate to complete the circuit and give an indication of a hole at such wiper location. Such a reader, of course, also requires some sort of card feed mechanism, either manual or automatic. Alternative card sensing systems have utilized optical sensing means, such as a light, comprising a light source and a photocell. However, such prior art optical sensing methods are quite bulky, expensive and require a large amount of peripheral equipment for their operation, such as power supplies and bulky electron tubes, as well as a relatively large number of passive circuit components.

It is further, very difficult to sense by mechanical means the newer micro-hole type of business card which is capable of storing a far greater amount of information than the standard business machine cards. With these newer type cards, the holes are on the order of 30 mils x 45 mils, which makes it extremely difficult to sense such cards by the commutator or wiper contact method outlined above.

It has now been found that an extremely compact and inexpensive solid state device utilizing a solid state photoconductor in conjunction with a solid state semiconductor thyratron has many advantages not available to prior art sensing apparatus.

It is accordingly a primary object of the present invention to provide an improved hole sensing circuit for use in detecting punched hole business cards.

It is a further object to provide such a circuit which does not require a local power supply for energization.

It is yet another object to provide a passive remote sensing unit for use with a central process unit.

The foregoing and other objects, features and advantages of the invention will be apparent from the following more particular description of preferred embodiments of the invention, as illustrated in the accompanying drawings.

The objects of the present invention are accomplished in general by a hole sensing unit which comprises in combination a light source and a solid state photoresponsive means positioned with respect to said light source so that it will receive light therefrom when a hole is present in a medium to be interrogated. The photoresponsive means is passive in nature and is provided with input terminals between which substantially zero resistance will be present when light is received by said device and the device is simultaneously interrogated by a suitable pulse.

The word passive as used herein denotes the fact that the sensing circuit does not contain any power supplies and is not maintained in an active condition. When the unit is interrogated, the sole energization therefor is a power pulse sent from the central process unit and depending upon the condition of the remote unit, it will appear as a substantial resistance or a short circuit as will be explained later.

Thus, the pulse from the central computer serves the dual function of an interrogation and energization pulse. The converse of passive as intended herein is the condition of a typical photocell and associated vacuum tube thyratron which would be maintained in a heated and active condition by power supplies connected to the various tube elements and to the tube heater.

Figure 1:
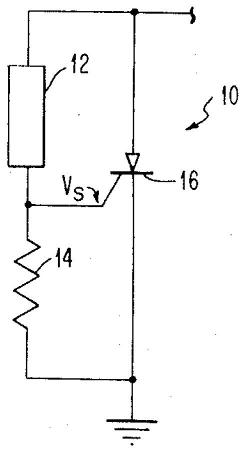
FIGURE 1 is a schematic diagram of a hole sensing circuit for a single channel of a remote unit constructed in accordance with the present invention.

The basic passive circuit anticipated by the present invention is exemplified by FIGURE 1. It will be seen that the circuit is extremely simple, requiring in this embodiment only three circuit elements. The circuit 10 comprises solid state photoconductive element 12, a bias resistor 14, and the semiconductor thyratron 16. The photoconductive element 12 may be chosen from any one of a large number of solid state photoconductive elements available on the market, such as for example, a Texas Instrument photo-duo-diode 1N2175. Alternatively, a photoconductor of the cadmium sulfide or cadmium selenide family may be used.

A semiconductor thyratron suitable for use with the present invention is a G.E. 2N2322 C5U silicon controlled rectifier.

Figure 2:
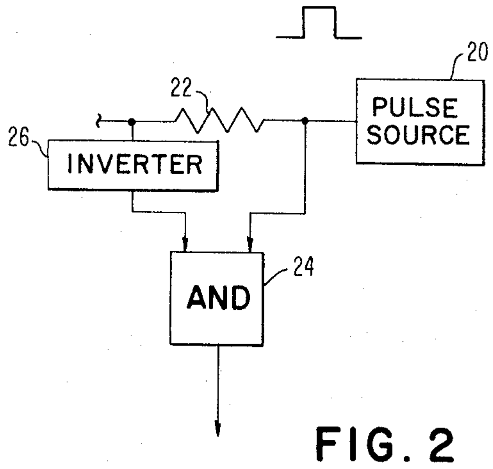
FIGURE 2 is a schematic diagram of an interrogation circuit suitable for connection to and use with the sensing circuit set forth in FIGURE 1 and, FIGURE 3 is a cross-sectional view of a simplified optical system suitable for use with the present invention.

FIGURE 2 illustrates a typical interrogating circuit for a remote terminal such as shown in FIGURE 1. An interrogating unit suitable for use with the present invention comprises a pulse source and detection circuitry capable of sensing whether or not the remote terminal is in its short circuited or resistive state. In FIGURE 2, this detection circuit comprises the load resistor 22, AND gate 24 and an inverter 26.

Figure 3:
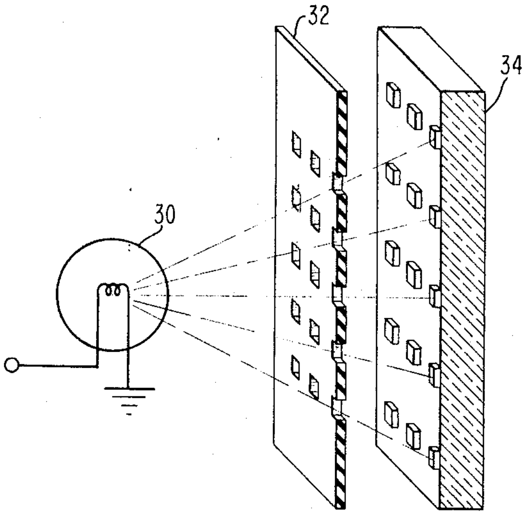

FIGURE 3 is a diagrammatic view partially in cross-section of a simplified optical system constructed in accordance with the present invention. A light source 30 is placed on one side of a punched card 32 which is to be interrogated or examined for holes and a photoconductor matrix 34 is located on the opposite side of the card 32 from a light source 30. The photoconductor matrix 34 comprises a plurality of individual photoconductor elements 36 deposited upon a suitable substrate 38. Each of the photoconductor elements 36 are connected by suitable leads (not shown) to separate detection circuits of the type shown in FIGURE 1. In the embodiment shown, the photoconductor matrix is shown to have as many columns and possible bit positions as the card being interrogated could have holes, however, it is to be understood that the detection matrix could utilize a single column and means provided for sweeping the card across said single column to effect complete readout as will be understood by a person skilled in the art. With the embodiment of FIGURE 3, any area on the card having a hole will cause an associated photoconductor element on the matrix 34 to be illuminated and render its associated circuit conductive in accordance with the principles set forth below.

*Operation*

In the circuit of FIGURE 1, when the photoconductive element 12 is not illuminated, it has a relatively high resistance and when an interrogation pulse is applied to the input terminal of the circuit, the resistance of the photoconductor prevents the voltage drop across biasing resistor 14 to reach a sufficient level to cause the semiconductor thyratron 16 to fire. Conversely, when a hole is present and when the photoconductive element 12 is illuminated, its resistance decreases by a large factor causing more current to flow through biasing resistor 14, which results in a bias voltage $V_s$ applied to the control electrode of the semi-conductor thyratron 16 to cause such thyratron to become conductive and effectively show a zero resistance or short circuit at the input terminals. The thyratron 16 will continue to conduct as long as the voltage pulse appears at the input terminal, regardless of whether the photoconductor 12 is any longer illuminated. Thus, it is not necessary for the light pulse and the interrogation pulse to be exactly synchronized. It is only required that they overlap by a very small time sufficient for the thyratron to be fired. It is, of course, understood that if there is any lack of synchronization, it should perferably be that the interrogation pulse lags the light input to the photoconductor.

While a separate input pulse source is indicated for each of the hole sensing circuits, it is, of course, to be understood that a single pulse could actuate a plurality of such hole sensing circuits. In such case, separate detectors at the central process unit would, of course, be required. As stated above, it is likewise to be understood that other detection circuits than the load resistor 22, inverter 26 and AND gate 24 shown in FIGURE 2 could be utilized to determine the condition of the remote hole sensing circuit. For example, the inverter 26 is utilized to make the output of the AND circuit directly readable in machine language, i.e., a hole gives a "1" binary indication.

The actual communication between the remote terminals of the present invention and the central process unit can be most easily effected by using a separate line or wire for each detection circuit at the terminal. However, certain multiplexing schemes known to persons skilled in the art could alternatively be used to cut down the number of conductors required.

The use of solid state devices for both the photoconductive element and the thyratron results in a terminal unit that is both compact and relatively free from maintenance. The fact that these solid state devices can be activated almost instantaneously by a combination interrogation and energization pulse, such as for example, of 6 volts and a duration of 5 milliseconds obviates the necessity for having power supplies at the remote terminals, thus greatly reducing and simplifying remote terminal installation. Also both devices are operable at relatively low voltages which further simplifies operation by a pulse source.

The use of the instant solid state thyratron and photoconductive element gives an indication that is the full equivalent, i.e., zero resistance, of the conventional mechanical wiper arm and contact type of punched card sensing mechanisms, is fully compatible with such a mechanical system and at the same time is capable of sensing much smaller holes than is normally possible with such mechanical systems. Such a circuit is far superior over, for example, a photoconductor alone, as the magnitude of the change is so great as to render detection very easy. The instant circuits' compatibility with mechanical switching functions also greatly simplifies combining the hole sensing function with other control functions which are performed most conveniently with, for example, micro-switches and cams.

There has thus been disclosed a far superior remote terminal card reader for use with a central process unit. The circuit is both simpler, cheaper, and more efficient than either the prior art mechanical hole sensing devices or gas filled photoconductor thyratron circuits known in the optical arts.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A passive remote terminal for use with a central computer comprising a hole sensing circuit utilizing in combination (a) a light source,
(b) a detection circuit comprising a solid state photoconductor, and
(c) a semiconductor thyratron connected in circuit relationship such that when the photoconductor is illuminated, the thyratron will be caused to fire and
(d) means for supplying a low voltage interrogation pulse to the photoconductor thyratron circuit, which circuit will appear as a substantially zero resistance path to said pulse when the photoconductor is illuminated,
(e) said means constituting the sole power source for said detection circuit.

2. A passive remote terminal unit for sensing holes punched in an opaque media which comprises (a) a light source adapted to be located on one side of said media,
(b) a hole sensing device adapted to be located on the opposite side of said media in registry with the light source when the hole appears in said media wherein said hole sensing device comprises a solid state photoresponsive means and a semiconductor thyratron connected in circuit relationship such that when the photoconductor is illuminated, the thyratron will fire upon application of a suitable power pulse
(c) illuminating means located on the opposite side of said opaque media from said sensing device,
(d) external circuit means connected to said hole sensing device through terminals provided therefor for applying a combination low voltage power and interrogation pulse to said device wherein, when the photoconductor is illuminated, the thyratron will fire and the circuit will exhibit substantially zero resistance at the external circuit terminals,
(e) said external circuit means comprising the sole power supply for said hole sensing device.

3. A passive remote terminal unit as set forth in claim 2, wherein the semiconductor thyratron is a silicon controlled rectifier.

4. A passive remote terminal unit as set forth in claim 3, wherein the photoresponsive means comprises a photodiode.

5. A passive remote terminal unit as set forth in claim 4, wherein the photoresponsive means comprises a photoconductor.

6. An optical hole sensing system comprising (a) a remotely located passive hole sensing circuit comprising (b) a photoconductive element,
(c) a first resistor and
(d) a semiconductor thyratron in such a circuit arrangement that when the circuit is interrogated by a suitable pulse concurrently with illumination of the photoconductive element, current is caused to flow in the resistor biasing the semiconductor thyratron to its conductive state, said pulse comprising the sole power source and actuating signal for said circuit, and
(e) interrogation circuit means remotely located from said sensing circuit comprising
(f) a pulse source for supplying the pulse to said hole sensing circuit,
(g) a second resistor connected in series between said pulse source and said hole sensing circuit, (h) an AND gate having one input directly connected to one side of said resistor
(i) an inverter connected between the other side of said resistor and a second input to said AND gate to produce an output from the AND gate when the sensing circuit is illuminated.

References Cited by the Examiner

UNITED STATES PATENTS

| | | | |
|---|---|---|---|
| 2,975,967 | 3/1961 | Martin | 235—61.115 |
| 3,209,154 | 9/1965 | Maring | 250—206 |

ROBERT C. BAILEY, *Primary Examiner.*

G. D. SHAW, *Assistant Examiner.*